(12) United States Patent
Strong et al.

(10) Patent No.: US 8,084,972 B2
(45) Date of Patent: Dec. 27, 2011

(54) DUAL LANE CONTROL OF A PERMANENT MAGNET BRUSHLESS MOTOR USING NON-TRAPEZOIDAL COMMUTATION CONTROL

(75) Inventors: Ronald E. Strong, Phoenix, AZ (US); Dean R. Wilkens, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 841 days.

(21) Appl. No.: 11/941,270

(22) Filed: Nov. 16, 2007

(65) Prior Publication Data
US 2009/0128072 A1 May 21, 2009

(51) Int. Cl.
*H02P 1/04* (2006.01)
(52) U.S. Cl. .............................. 318/400.17; 318/400.01
(58) Field of Classification Search ............. 318/400.01, 318/400.17
See application file for complete search history.

(56) References Cited

U.S. PATENT DOCUMENTS

| | | | |
|---|---|---|---|
| 4,622,667 A | 11/1986 | Yount | |
| 4,887,214 A | 12/1989 | Takats et al. | |
| 5,519,601 A * | 5/1996 | Close et al. | 363/98 |
| 5,657,217 A * | 8/1997 | Watanabe et al. | 363/71 |
| 5,689,170 A | 11/1997 | Ishikawa | |
| 5,737,164 A * | 4/1998 | Ferreira et al. | 361/31 |
| 5,805,797 A | 9/1998 | Sato et al. | |
| 6,107,774 A | 8/2000 | Yamada et al. | |
| 6,198,241 B1 | 3/2001 | Calamatas | |
| 6,242,884 B1 * | 6/2001 | Lipo et al. | 318/808 |
| 6,441,573 B1 | 8/2002 | Zuber et al. | |
| 6,441,578 B1 * | 8/2002 | Mir et al. | 318/599 |
| 6,492,790 B2 | 12/2002 | Yoshikawa et al. | |
| 6,573,672 B2 | 6/2003 | O'Rourke et al. | |
| 6,687,590 B2 | 2/2004 | Kifuku et al. | |
| 6,710,564 B2 | 3/2004 | Shibuya et al. | |
| 6,815,920 B2 | 11/2004 | Cohen et al. | |
| 6,859,008 B1 * | 2/2005 | Seibel | 318/799 |
| 6,919,702 B2 | 7/2005 | Szulyk | |
| 7,154,244 B2 | 12/2006 | Asaumi et al. | |
| 2003/0090228 A1 * | 5/2003 | Wilkens | 318/560 |

(Continued)

FOREIGN PATENT DOCUMENTS
EP 1826899 8/2007
(Continued)

OTHER PUBLICATIONS
European Search Report for Application No. 08169198, mailed on Mar. 24, 2009.

*Primary Examiner* — Walter Benson
*Assistant Examiner* — Kawing Chan
(74) *Attorney, Agent, or Firm* — Ingrassia Fisher & Lorenz, P.C.

(57) ABSTRACT

A motor control system and method implements non-trapezoidal motor control and meets established "fail passive" regulatory guidelines. In particular, a system and method of controlling a multi-phase brushless motor that includes a multi-pole permanent magnet rotor, and an individual, electrically isolated stator winding associated with each phase that includes a first terminal and a second terminal. A motor command is supplied to a motor control. The motor control is configured such that the first terminal of each stator winding is selectively coupled to a power source at a first duty cycle, and the second terminal of each stator winding is selectively coupled to a power source asynchronously with the first terminal of each stator winding at a second duty cycle.

14 Claims, 3 Drawing Sheets

U.S. PATENT DOCUMENTS

| | | |
|---|---|---|
| 2007/0090785 A1 | 4/2007 | Ho |
| 2007/0236186 A1 | 10/2007 | Patterson |
| 2009/0134828 A1* | 5/2009 | Chakrabarti et al. ......... 318/440 |
| 2009/0230905 A1* | 9/2009 | Proctor et al. ........... 318/400.09 |

FOREIGN PATENT DOCUMENTS

| | | | |
|---|---|---|---|
| JP | 60098875 A | * | 6/1985 |
| JP | 10337036 | | 12/1998 |
| JP | 20050137197 | | 5/2005 |

* cited by examiner

DUAL LANE CONTROL OF A PERMANENT MAGNET BRUSHLESS MOTOR USING NON-TRAPEZOIDAL COMMUTATION CONTROL

TECHNICAL FIELD

The present invention generally relates to brushless motor control and, more particularly, to system and method for controlling a permanent magnet brushless motor using non-trapezoidal commutation control.

BACKGROUND

Aircraft are increasingly including electric motors to drive various system components, rather than presently or previously used pneumatic or hydraulic motors or other devices. For many aircraft systems, regulatory agencies have established guidelines for system design to accommodate postulated, yet highly unlikely events, such as a component within the system becoming unavailable or otherwise inoperable. In many instances, the established guidelines require that a system be designed to "fail passive" in the face of such postulated, yet highly unlikely events.

In order to increase reliability and fault tolerance, and to meet the established regulatory guidelines, many electric motor control systems include redundant motor controls. One such motor control system is disclosed in U.S. Pat. No. 6,573,672 (the '672 patent), entitled "Fail Passive Servo Controller," which is assigned to the assignee of the instant application. The motor control disclosed in the '672 patent implements a polarity voting scheme between redundant brushless motor control lanes. The disclosed polarity voting scheme is well-suited for a trapezoidal commutation scheme. However, it is not at all well-suited for non-trapezoidal commutation schemes, such as field oriented control (FOC)/space vector modulation (SVM) or sinusoidal commutation control. As is generally known, non-trapezoidal commutation schemes provide smoother motor torque control than trapezoidal commutation control schemes.

Accordingly, it is desirable to provide a motor control system and method that implements non-trapezoidal motor control and that meets established "fail passive" regulatory guidelines. The present invention addresses at least this need.

BRIEF SUMMARY

In one embodiment, and by way of example only, a motor control system includes a multi-phase brushless motor and a motor control. The motor includes a multi-pole permanent magnet rotor and an individual, electrically isolated stator winding associated with each phase that includes a first terminal and a second terminal. The motor control is coupled to each of the stator windings, and includes a first control lane and a second control lane. The first control lane is responsive to a motor command signal to selectively couple the first terminal of each stator winding to a power source at a first duty cycle that is equal to a value of DC. The second control lane is configured to operate asynchronously with the first control lane. The second control lane is responsive to the motor command signal to selectively couple the second terminal of each stator winding to the power source at a second duty cycle that is equal to a value of (100%-DC).

In another exemplary embodiment, a motor control includes a first control lane and a second control lane. The first control lane includes a plurality of first output terminals, and is responsive to a motor command signal to selectively couple each of the plurality of first output terminals to a power source at a first duty cycle that is equal to a value of DC. The second control lane includes a plurality of second output terminals, is configured to operate asynchronously with the first control lane, and is responsive to the motor command signal to selectively couple each of the plurality of second output terminals to the power source at a second duty cycle that is equal to a value of (100%-DC).

In yet another exemplary embodiment, a method of controlling a multi-phase brushless motor that comprises a multi-pole permanent magnet rotor and an individual, electrically isolated stator winding associated with each phase that includes a first terminal and a second terminal includes the steps of supplying a motor command. The first terminal of each stator winding is selectively coupled to a power source at a first duty cycle that is equal to a value of DC, and the second terminal of each stator winding is selectively coupled to the power source asynchronously with the first terminal of each stator winding at a second duty cycle that is equal to a value of (100%-DC).

In still a further exemplary embodiment, a motor control system includes a brushless motor and a motor control. The brushless motor includes a multi-phase stator and a multi-pole permanent magnet rotor. The multi-phase stator is operable, upon being energized, to generate and apply a torque to the rotor. The motor control is coupled to, and is operable to selectively energize, the multi-phase stator, and includes a first control lane, a second control lane, a vector sum output circuit, and a plurality of controllable switches. The first control lane is coupled to receive the motor command signal and is operable, in response to the motor command, to generate a plurality of first pulse width modulated (PWM) voltage signals. The second control lane is coupled to receive the motor command signal, and is operable, in response to the motor command, to generate a plurality of second pulse width modulated (PWM) voltage signals. The vector sum output circuit is coupled to receive the plurality of first PWM voltage signals and the plurality of second PWM voltage signals, and is operable to generate a plurality of vector sum voltage signals from the plurality of first and second PWM voltage signals, and a plurality of average PWM voltage signals from the plurality of vector sum voltage signals. Each of the plurality of controllable switches is coupled to receive one of the average PWM voltage signals, and is operable, in response thereto, to selectively open and close, to thereby selectively energize and de-energize the multi-phase stator.

In yet still another exemplary embodiment, a motor control for selectively energizing a multi-phase stator includes a first control lane, a second control lane, a vector sum output circuit, and a plurality of controllable switches. The first control lane is coupled to receive a motor command signal and is operable, in response to the motor command, to generate a plurality of first pulse width modulated (PWM) voltage signals. The second control lane is coupled to receive the motor command signal, and is operable, in response to the motor command, to generate a plurality of second pulse width modulated (PWM) voltage signals. The vector sum output circuit is coupled to receive the plurality of first PWM voltage signals and the plurality of second PWM voltage signals, and is operable to generate a plurality of vector sum voltage signals from the plurality of first and second PWM voltage signals and a plurality of average PWM voltage signals from the plurality of vector sum voltage signals. Each of the controllable switches is coupled to receive one of the average PWM voltage signals and is operable, in response thereto, to selectively open and close.

Other desirable features and characteristics of the motor control system and method will become apparent from the subsequent detailed description and the appended claims, taken in conjunction with the accompanying drawings.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
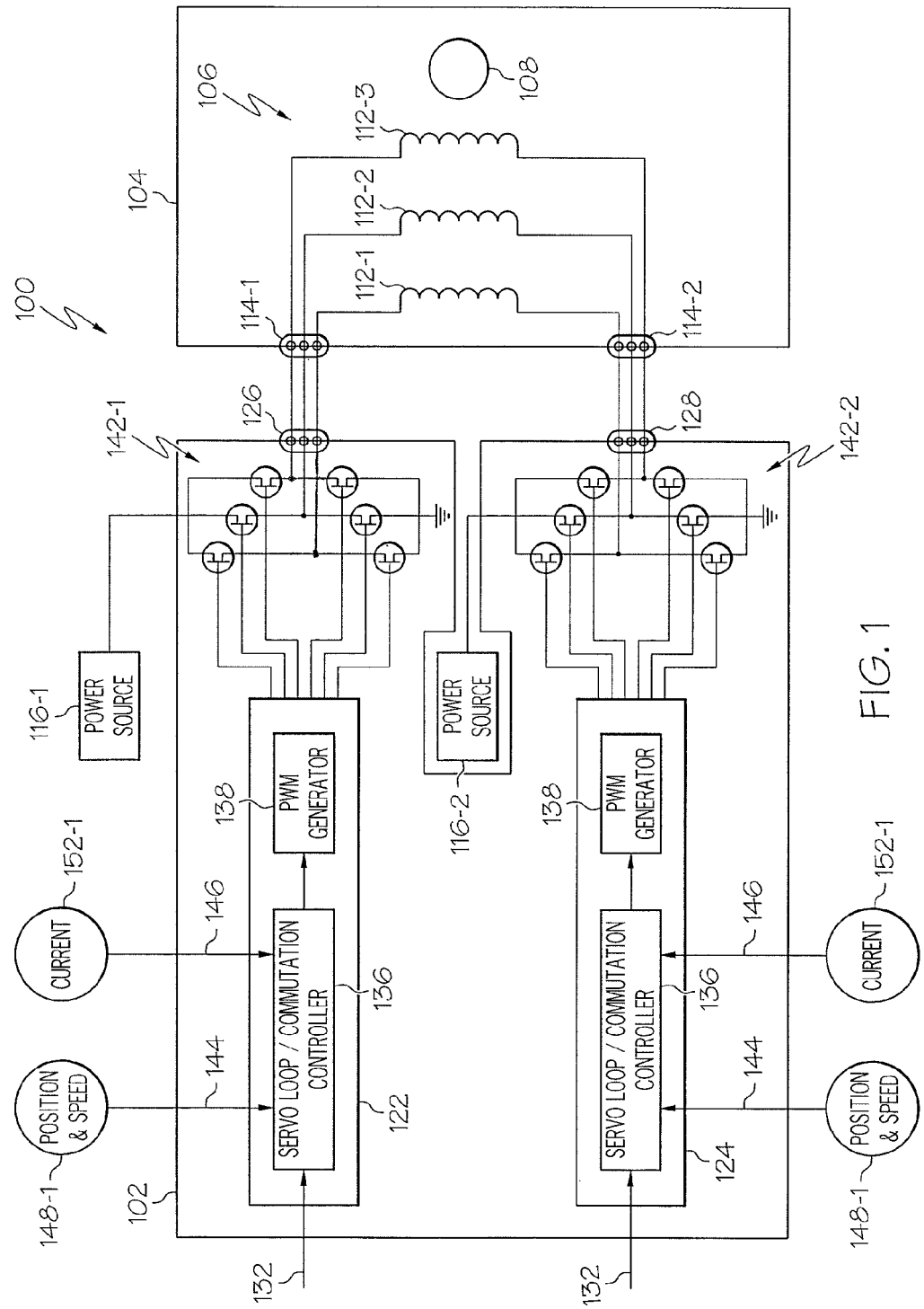
FIG. 1 is a functional block diagram of an exemplary dual lane, fail passive motor control system for implementing non-trapezoidal motor control.

Referring first to FIG. 1, a functional block diagram of an exemplary dual lane motor control system is depicted. The motor control system 100 includes a motor control 102 and a motor 104. The motor 104 is preferably a multi-phase brushless machine, and most preferably a three-phase brushless machine, and includes a multi-phase stator 106 and a rotor 108. The stator 106 is implemented with a plurality of individual, electrically isolated stator windings, one each associated with each phase. Thus, in the depicted embodiment the stator includes three individual, electrically isolated stator windings 112 (e.g., 112-1, 112-2, 112-3). Each stator winding 112 includes two terminals 114, a first terminal 114-1 and a second terminal 114-2. As will be described in more detail further below, the motor control 102 is configured to selectively couple, in an asynchronous manner, the first and second terminals 114-1, 114-2 of each stator winding 112 to a power source 116 (116-1, 116-2). In the depicted embodiment, redundant power sources 116-1, 116-2 are used. Nonetheless, the stator windings 112, upon being energized, generate and apply a torque to the rotor 108.

The rotor 108 is preferably implemented as a multi-pole permanent magnet rotor. The rotor 108 is also configured to rotate upon a torque being applied thereto. As such, when the stator windings 112 are energized, and thus generate and apply a torque to the rotor 108, the rotor 108 rotates in the direction and speed of the applied torque.

The motor control 102 is coupled to the stator 106 and, as was alluded to above, is configured to selectively couple, in an asynchronous manner, the first and second terminals 114-1, 114-2 of each stator winding 112 to one of the power sources 116. To implement this functionality the motor control 102 is configured in a dual lane architecture, and thus includes a first control lane 122 and a second control lane 124. The motor control 102 is also configured such that if a single component in either the first or the second control lanes 122, 124 becomes inoperable, the motor control 102 will prevent the inoperable lane from inducing an incorrect current, which could result in an undesirable motor acceleration or rotation.

The first control lane 122 includes a plurality of first output terminals 126, each of which is coupled to the first terminal 114-1 of one of the stator windings 112. Similarly, the second control lane includes a plurality of second output terminals 128, each of which is coupled to the second terminal 114-2 of one of the stator windings 112. The first control lane 122 is responsive to a motor command signal 132 to selectively couple each of the plurality of first output terminals 126 to one power source 116-1 based on the motor command signal 132. The second control lane 124 is configured to operate asynchronously with the first control lane 122, and is also responsive to an identical motor command signal 132 to selectively couple each of the plurality of second output terminals 128 to the other power source 116-1 based on the motor command signal 132. As will now be described, although the first and second control lanes 122, 124 operate asynchronously, the control lanes 122, 124 are configured substantially identically. Before doing so, however, it is noted that although the motor command signal 132 supplied to the first control lane 122 is depicted as being separate from the motor command signal 132 supplied to the second control lane 124, the motor command signals 132 may be the same signal.

The first and second control lanes 122, 124, at least in the depicted embodiment, each include at least a servo loop/commutation controller 136, a PWM generator 138, and a plurality of controllable switches 142 (e.g., 142-1, 142-2). Before proceeding further, it is noted that this is merely exemplary of one suitable configuration that may be used to implement the first and second control lanes 122, 124. Moreover, it will be appreciated that the control lanes 122, 124 could each include additional circuitry depending, for example, on the end-use of the motor control system 100, and that the servo loop/commutation controller 136 and PWM generator 138 could be implemented using various known devices and circuit configurations for carrying out the functions that will now be described.

The servo loop/commutation controllers 136 are coupled to receive the motor command signal 132 and one or more feedback signals. The servo loop/commutation controllers 136, in response to the motor command signal and the one or more feedback signals, each supply suitable control signals to the associated PWM generator 138. The PWM generators 138 are configured to supply a plurality of PWM voltage signals, having duty cycles that vary based on the control signals supplied from the associated servo loop/commutation controller 136, to the associated plurality of controllable switches 142.

Before proceeding further, it is noted that the number and type of feedback signals supplied to the servo loop/commutation controllers 136 may vary depending, for example, on the motor control scheme and/or commutation control scheme being implemented. For example, the motor control scheme may be either speed control or torque control, and the commutation scheme may be either field oriented control (FOC) or sinusoidal control. In the depicted embodiment the motor control 102 is configured to implement torque control and FOC. As such, the feedback signals supplied to the servo loop/commutation controllers 136 include motor position/speed feedback signals 144 and motor current feedback signals 146. In the depicted embodiment, the motor position/speed feedback signals 144 and the motor current feedback signals 146 are supplied to each control lane 122, 124 from separate, redundant position sensors 148 (e.g., 148-1, 148-2) and separate, redundant current sensors 152 (e.g., 152-1, 152-2), respectively.

Returning once again to a description of each control lane 122, 124, the plurality of controllable switches 142 associated with each control lane 122, 124 are configured as a full three-phase bridge. As such, there is a pair of series-coupled controllable switches associated with each individual stator winding 112. Moreover, it may be seen that each of the first output terminals 126 is disposed between a different pair of the series-coupled controllable switches 142-1 of the first lane 122, and each of the second output terminals 128 is disposed between a different pair of the series-coupled controllable switches 142-2 of the second lane 124. It thus follows that the first terminal 114-1 of each stator winding 112 is coupled between one pair of series controllable coupled switches 142-1 of the first control lane 122, and the second terminal 114-2 of each stator winding is coupled between one pair of series coupled controllable switches 142-2 of the second control lane 124. In the depicted embodiment the controllable switches 142 are each implemented using suitable field effect transistors (FETs), but could also be implemented using any one of numerous other suitable controllable switch devices.

No matter how the controllable switches 142 are specifically implemented, each is responsive to the PWM voltage signals supplied from the associated PWM generator 138 to move between an open and closed position (or equivalents thereof) at the duty cycles of the PWM voltage signals, to thereby selectively couple the first and second terminals 114-1, 114-2 of each stator winding 112 to the power sources 116-1, 116-2. More specifically, the first control lane 122 selectively couples the first terminal 114-1 of each stator winding 112 to one power source 116-1 at a first duty cycle (e.g., the duty cycles of the PWM voltage signals supplied from the first control lane PWM generator 138), and the second control lane asynchronously couples the second terminal 114-2 of each stator winding 112 to the other power source 116-2 at a second duty cycle (e.g., the duty cycles of the PWM voltage signals supplied from the first control lane PWM generator 138).

It was noted above that the first and second control lanes 122, 124 operate asynchronously. Moreover, from the above description it should be understood that the second control lane 124 selectively couples the second terminal 114-2 of each stator winding 112 to the associated power source 116-2 in accordance with a commutation control scheme that is essentially inverted relative to the commutation control scheme implemented in the first control lane 122. This motor operation scheme differs significantly from those presently known, in that presently known dual channel motor controls rely on synchronization between the control lanes. With the instant motor control system 100, the inductance of the stator windings 112 is used to achieve the necessary synchronization. As such, if the duty cycle of the first control lane 122 is equal to a value of DC, then the duty cycle of the second control channel 124 will be equal to a value of (100%-DC), which may or may not be equal to DC.

Figure 2:
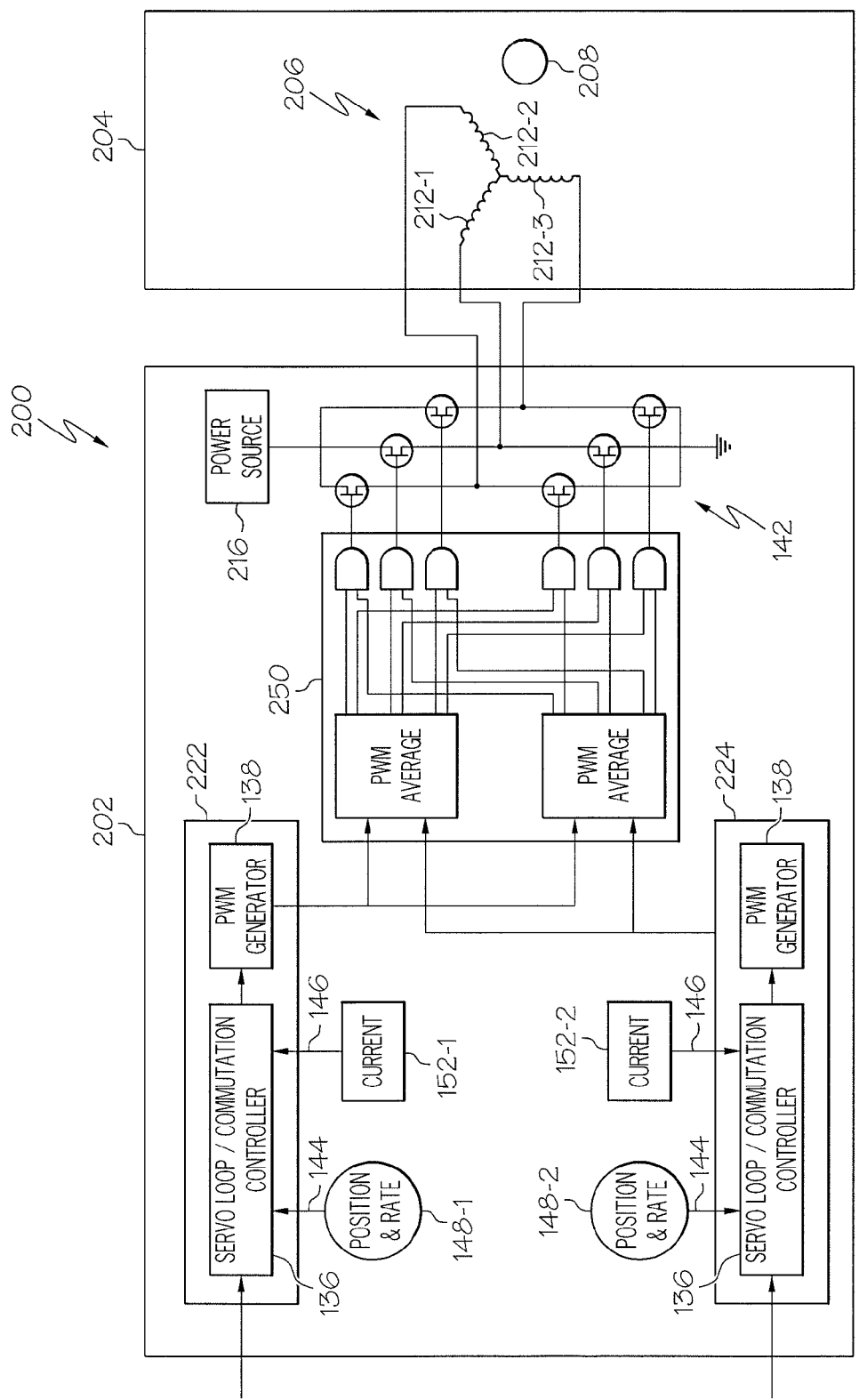
FIG. 2 is a functional block diagram of another embodiment of an exemplary dual lane, fail passive motor control system for implementing non-trapezoidal motor control.

Turning now to FIG. 2, a functional block diagram of another embodiment of an exemplary dual lane, fail passive motor control system 200 for implementing non-trapezoidal motor control is depicted. This embodiment is similar in many respects to the previous embodiment. In particular, the depicted system 200 includes a motor control 202 and a motor 204, the motor control 202 includes a first control lane 222 and a second control lane 224, both control lanes 222, 224 preferably implement a non-trapezoidal commutation control scheme, and the motor control is configured to prevent current flow through at least a portion of the motor 204 if a single component in either the first or the second control lanes 222, 224 becomes inoperable. It is noted that those portions of the motor control 202 that function identically, or at least substantially identically, to those described in the first embodiment will be numbered with like reference numerals and descriptions of these portions will not be repeated. Before describing this motor control 202, a description of the motor 204 will first be provided.

The motor 204 depicted in FIG. 2, like the one depicted in FIG. 1, 102 is preferably a multi-phase brushless machine, and most preferably a three-phase brushless machine, that includes a multi-phase stator 206 and a rotor 208. The stator 206 is implemented with a plurality of individual stator windings, one each associated with each phase, and thus includes three stator windings 212 (e.g., 212-1, 212-2, 212-3). However, in this embodiment the stator windings 212 are electrically coupled in the well-known WYE configuration. As will be described in more detail further below, the motor control 202 is configured to selectively couple the stator windings 212 to a power source 216 to generate and apply a torque to the rotor 208. The rotor 208, as before, is preferably implemented as a multi-pole permanent magnet rotor, and is configured to rotate upon a torque being applied thereto. As such, when the stator windings 212 are energized, and thus generate and apply a torque to the rotor 208, the rotor 208 rotates in the direction and speed of the applied torque.

Figure 3:
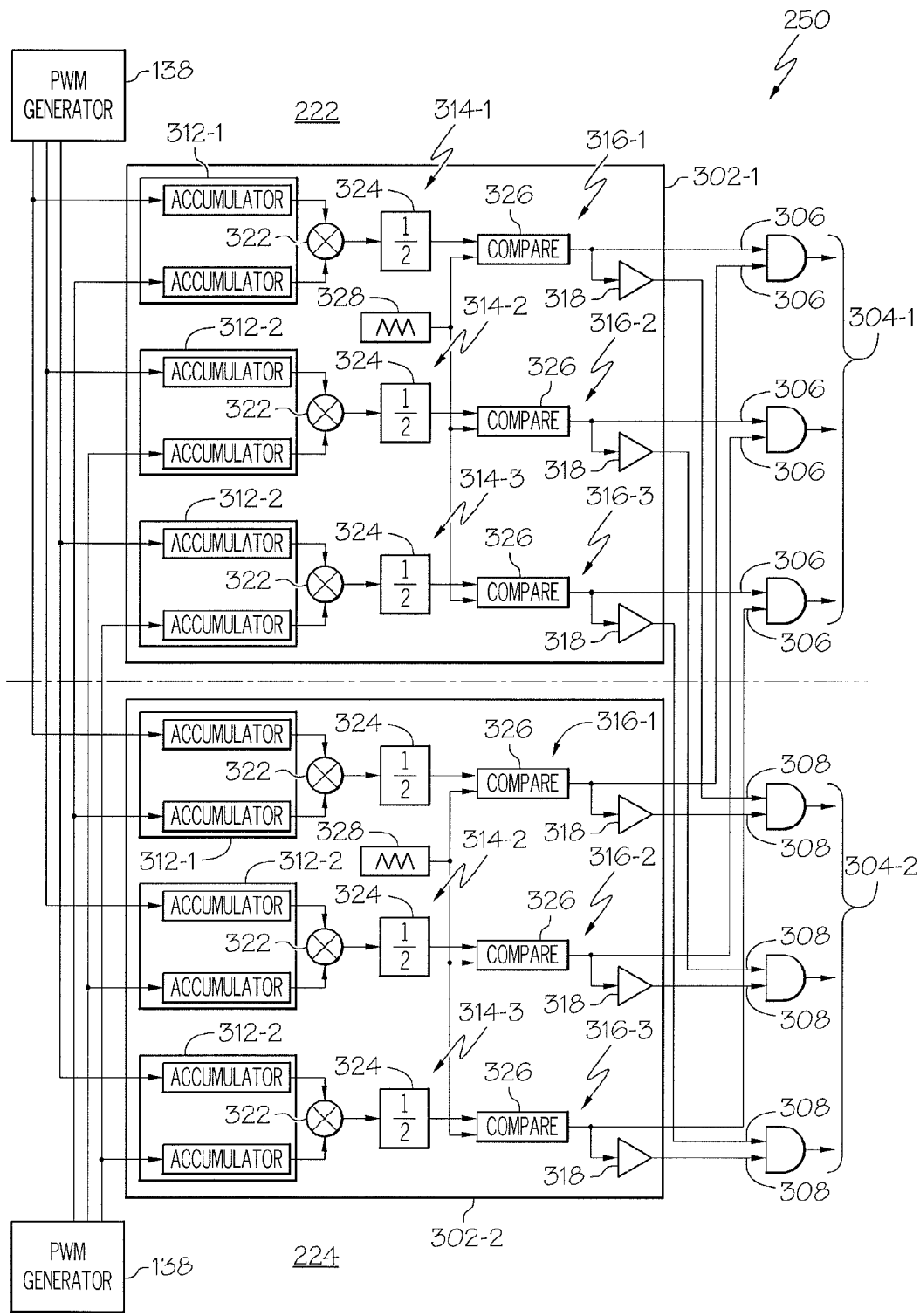
FIG. 3 is a functional block diagram of an exemplary vector sum output circuit that may be used to implement the motor control of FIG. 2.

Turning now to the motor control 202, in this embodiment the motor control 202 differs from the previously described motor control 102 in that the plurality of switches 142 are configured as one full three-phase bridge, rather than as two, and the motor control digitally creates a vector sum of the output of the control lanes 222, 224. To implement this unique functionality, the motor control includes a vector sum output circuit 250. The vector sum output circuit 250 is coupled to receive the PWM voltage signals supplied from the PWM generator 138 in the first control lane 222 and the plurality of PWM voltage signals supplied from the PWM generator 138 in the second control lane 224. The vector sum output circuit 250, in response to these PWM voltage signals, generates a plurality of vector sum voltage signals from the plurality of first and second PWM voltage signals, and a plurality of average PWM voltage signals from the plurality of vector sum voltage signals. The average PWM voltage signals are supplied, one each, to each of the controllable switches 142. The controllable switches 142, as previously described, are responsive to the average PWM voltage signals to selectively open and close, to thereby selectively energize and de-energize the multi-phase stator 206. With reference to FIG. 3, a particular embodiment of the vector sum output circuit 250 is depicted and will now be described.

The vector sum output circuit 250 includes a first PWM average circuit 302-1, a second PWM average circuit 302-2, a first plurality of AND gates 304-1, and a second plurality of AND gates 304-2. The first and second PWM average circuits 302-1, 302-2 are each coupled to receive the PWM voltage signals from the first and second control lanes 222, 224. The first and second PWM average circuits 302-1, 302-2 are each configured, in response to the PWM voltage signals, to generate a plurality of PWM average voltage signals 306 and a plurality of inverted PWM average voltage signals 308. The PWM average voltage signals 306 are each equal to, or at least substantially equal to, the mathematical average of one of the PWM voltage signals from the first control lane 222 and one of the PWM voltage signals from the second control lane 224. It may thus be appreciated that each inverted PWM average voltage signal 308 is equal to, or at least substantially equal to, an inversion of one of the PWM average voltage signals 306.

The first plurality of AND gates 304-1 are each coupled to receive PWM average voltage signals 306 from each PWM average circuit 302-1, 302-2, and the second plurality of AND gates 304-2 are each coupled to receive inverted PWM average voltage signals 308 from each PWM average circuit 302-

1, 302-2. In particular, each of the first plurality of AND gates 304-1 is coupled to receive one of the PWM average voltage signals 306 from the first control lane 222 and one of the PWM average voltage signals 306 from the second control lane 224. Similarly, each of the second plurality of AND gates 304-2 is coupled to receive one of the inverted PWM average voltage signals 308 from the first control lane 222 and one of the inverted PWM average voltage signals 308 from the second control lane 224. It may thus be seen that with this configuration both control lanes 222, 224 must agree before a controllable switch 142 can be commanded to transition between open and closed positions, thereby providing the "fail passive" response.

It may be appreciated that the PWM average circuits 302-1, 302-2 that are used to implement the vector sum output circuit 250 may be variously implemented to provide the described functionality. Nonetheless, with continued reference to FIG. 3 it is seen that in the depicted embodiment the PWM average circuits 302-1, 302-2 each include a plurality of accumulator pairs 312 (e.g., 312-1, 312-2, 312-3), a plurality of averaging circuits 314 (e.g., 314-1, 314-2, 314-3), a plurality of PWM generators 316 (316-1, 316-2, 316-3), and a plurality of inverters 318 (e.g., 318-1, 318-2, 318-3), one of each for each motor phase. The accumulator pairs 312 are each coupled to receive and accumulate one of the PWM voltage signals from the first control lane 222 and one of the PWM voltage signals from the second control lane 224.

The averaging circuits 314 are each coupled to one of the accumulator pairs 312, and are each implemented with a summation function 322 and a divide-by-two function 324. The summation function 322 receives the accumulated PWM signals from the associated accumulator pair 312, generates the mathematical summation, and supplies this to the divide-by-two function 324. The divide-by-two function 324, as the nomenclature connotes, divides the mathematical summation by two, and thus supplies an average signal representative of the mathematical average of the accumulated PWM signals to one of the PWM generators 316.

The PWM generators 316 are each coupled to receive an average signal from one of the averaging circuits 314, and are each operable to supply a PWM average voltage signal 306. As depicted, the PWM average voltage signal 306 is supplied to one of the AND gates 304-1, 304-2 and to one of the inverters 318. The inverters 318 invert the PWM average voltage signal and supply an inverted PWM average voltage signal to a corresponding AND gate 304-1, 304-2 of the opposing control lane 222, 224. Each PWM generator 316 includes a comparator 326 that is coupled to a triangle generator 328. As is generally known, the topology of a comparator 326 and triangle generator 328 will generate a PWM signal. In the depicted embodiment, each PWM average circuit 302-1, 302-2 includes a single triangle generator 328. It will be appreciated, however, that the PWM average circuits 302-1, 302-2 could be implemented with more than this number of triangle generators 328.

No matter the specific number of triangle generators 328 per PWM average circuit 302-1, 302-2, it will be appreciated that the triangle generators 328 are preferably synchronized, or at least substantially synchronized. This is because a lack of synchronization between the triangle generators 328 will translate to some loss of voltage gain because it can result the controllable switches 142 associated with a motor phase both being in an open (or equivalent) condition. Although exact synchronization is not required, at least substantial synchronization is desired. Thus, though not depicted in FIG. 3, the triangle generators 328 in each control lane 222, 224 are in operable communication with each other.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A motor control system, comprising:
a multi-phase brushless motor including a multi-pole permanent magnet rotor and an individual, electrically isolated stator winding associated with each phase, each stator winding including a first terminal and a second terminal; and
a motor control coupled to each of the stator windings, the motor control comprising:
a first control lane responsive to a motor command signal to selectively couple the first terminal of each stator winding to a power source at a first duty cycle, the first duty cycle equal to a value of DC, and
a second control lane configured to operate asynchronously with the first control lane, the second control lane responsive to the motor command signal to selectively couple the second terminal of each stator winding to a power source at a second duty cycle, the second duty cycle equal to a value of (100%-DC).

2. The system of claim 1, wherein:
the first control lane is operable to selectively couple the first terminal of each stator winding to the power source in accordance with a first pulse width modulation (PWM) control scheme; and
the second control lane is operable to asynchronously couple the second terminal of each stator winding to the power source in accordance with a second PWM control scheme, the second control scheme being an inversion of the first PWM scheme.

3. The system of claim 2, wherein the first and second PWM control schemes are each field oriented control schemes.

4. The system of claim 3, further comprising:
a plurality of first control lane current sensors, each first control lane current sensor coupled to sense current flow through one of the stator windings and operable to supply a signal representative of the sensed current to the first control lane; and
a plurality of second control lane current sensors, each second control lane current sensor coupled to sense current flow through one of the stator windings and operable to supply a signal representative of the sensed current to the second control lane.

5. The system of claim 4, further comprising:
a first control lane position sensor coupled to sense rotor position and operable to supply a signal representative of the sensed rotor position to the first control lane; and
a second control lane position sensor coupled to sense rotor position and operable to supply a signal representative of the sensed rotor position to the second control lane.

6. The system of claim 2, wherein the first and second PWM control schemes are each sinusoidal control schemes.

7. The system of claim 6, further comprising:
a plurality of first control lane current sensors, each first control lane current sensor coupled to sense current flow through one of the stator windings and operable to supply a signal representative of the sensed current to the first control lane; and
a plurality of second control lane current sensors, each second control lane current sensor coupled to sense current flow through one of the stator windings and operable to supply a signal representative of the sensed current to the second control lane.

8. The system of claim 7, further comprising:
a first control lane position sensor coupled to sense rotor position and operable to supply a signal representative of the sensed rotor position to the first control lane; and
a second control lane position sensor coupled to sense rotor position and operable to supply a signal representative of the sensed rotor position to the second control lane.

9. The system of claim 1, further comprising:
a plurality of current sensors, each current sensor coupled to sense current flow through one of the stator windings and operable to supply a signal representative of the sensed current to the first and second control lanes; and
a position sensor coupled to sense motor rotational position and operable to supply a signal representative of the sensed rotational position to the first and second control lanes.

10. The system of claim 1, wherein:
the first control lane comprises a first pair of series-coupled switches associated with each stator winding, the first terminal of each stator winding coupled between one of the first pair of series coupled switches; and
the second control lane comprises a second pair of series-coupled switches associated with each stator winding, the second terminal of each stator winding coupled between one of the second pair of series coupled switches.

11. The system of claim 10, wherein the motor control is configured such that if a single component in either the first or the second control lanes becomes inoperable, the motor control will prevent inducement of a current that could result in an undesirable motor acceleration or rotation.

12. A motor control, comprising:
a first control lane including a plurality of first output terminals, the first control lane responsive to a motor command signal to selectively couple each of the plurality of first output terminals to a power source at a first duty cycle, the first duty cycle equal to a value of DC; and
a second control lane including a plurality of second output terminals and configured to operate asynchronously with the first control lane, the second control lane responsive to the motor command signal to couple each of the plurality of second output terminals to the power source at a second duty cycle, the second duty cycle equal to a value of (100%-DC).

13. The motor control of claim 12, wherein:
the first control lane is operable to selectively couple each of the plurality of first output terminals to the power source in accordance with a first pulse width modulation (PWM) control scheme; and
the second control lane is operable to asynchronously couple each of the second output terminals to the power source in accordance with a second PWM control scheme, the second control scheme being an inversion of the first PWM scheme.

14. A method of controlling a multi-phase brushless motor that comprises a multi-pole permanent magnet rotor and an individual, electrically isolated stator winding associated with each phase, wherein each stator winding includes a first terminal and a second terminal, the method comprising the steps of:
supplying a motor command;
selectively coupling the first terminal of each stator winding to a power source at a first duty cycle having a value of DC;
selectively coupling the second terminal of each stator winding to a power source asynchronously with the first terminal of each stator winding at a second duty cycle having a value of (100%-DC).

* * * * *